(No Model.) 2 Sheets—Sheet 1.
T. R. CAPWELL & W. C. FULLER.
VEHICLE.
No. 493,614. Patented Mar. 14, 1893.
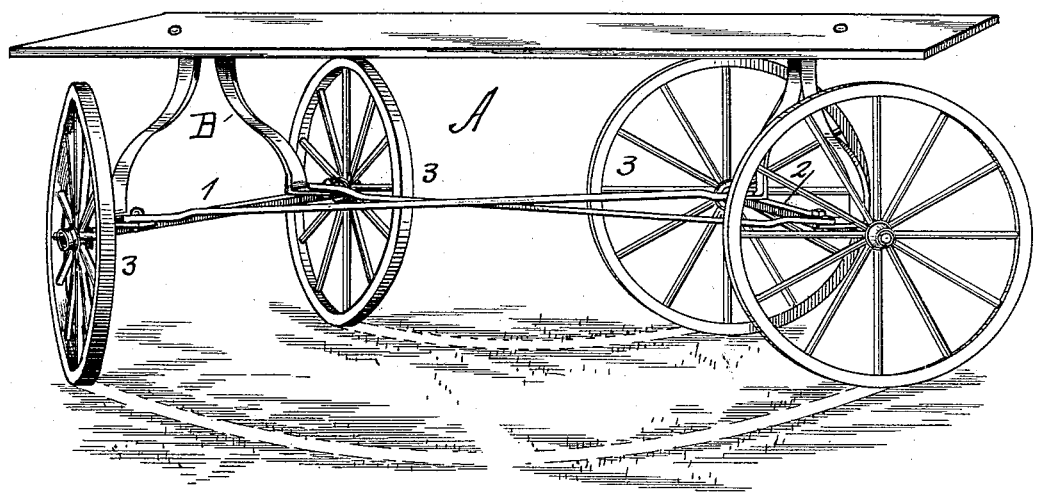
WITNESSES:
INVENTORS
Thomas R. Capwell,
William C. Fuller.
BY
Smith & Brusow
ATTORNEYS (No Model.) 2 Sheets—Sheet 2.
T. R. CAPWELL & W. C. FULLER.
VEHICLE.
No. 493,614. Patented Mar. 14, 1893.
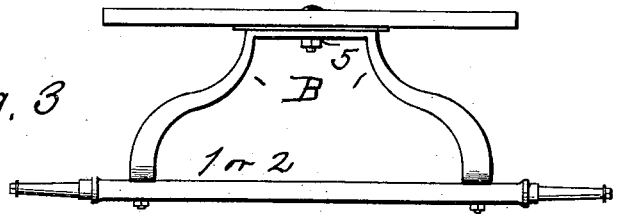
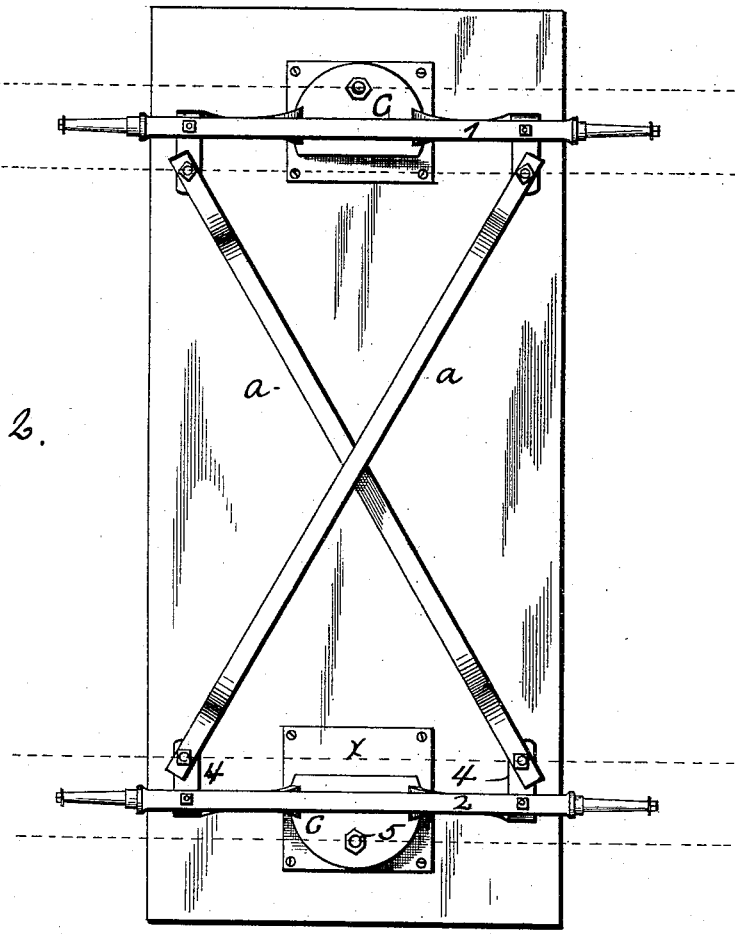
WITNESSES:
H. A. Carhart
Geo M Blivers
INVENTORS
Thomas R. Capwell
William C. Fuller
BY
Smith & Bruson
ATTORNEYS

UNITED STATES PATENT OFFICE.

THOMAS R. CAPWELL AND WILLIAM C. FULLER, OF DUNKIRK, NEW YORK.

VEHICLE.

SPECIFICATION forming part of Letters Patent No. 493,614, dated March 14, 1893.

Application filed May 31, 1892. Serial No. 434,940. (No model.)

*To all whom it may concern:*

Be it known that we, THOMAS R. CAPWELL and WILLIAM C. FULLER, of Dunkirk, in the county of Chautauqua, in the State of New York, have invented new and useful Improvements in Vehicles, of which the following, taken in connection with the accompanying drawings, is a full, clear, and exact description.

Our invention relates to the construction of wagons.

Our object is to produce a light truck wagon which may be used in close quarters and so arranged as to turn short corners, and compel at all times, the wheels to track, so that wherever it is possible to drive the forward wheels, the hind wheels will always follow the same track.

We have found by repeated experiments that there are certain detail proportions which must be substantially adhered to in order to produce this result. And to that end our invention consist first, in connecting the axles with diagonal reaches; second, in constructing the connection between the axles and the platform of the wagon all in one piece; and in the several other novel features of construction and operation hereinafter described and which are specifically set forth in the claim hereto annexed. It is constructed as follows, reference being had to the accompanying drawings, in which Figure 1, is an isometrical elevation of the wagon, complete. Fig. 2, is a bottom plan view thereof with the wheels removed. Fig. 3, is an end view thereof.

A—, is the vehicle having front and rear axles —1— and —2— provided with wheels —3— in the ordinary way.

4—, are projections extending inwardly from the axles and are located upon the axle each side of the king-bolt, equal to substantially one-quarter of the length of the diagonal reaches, that is, their distance apart is equal to one-half the length of the diagonal reach., —a—. The pieces —4—, by which the reaches are connected to the axle and adapted to move laterally are of a length equal to one-eighth of the distance between said pieces —4—, when the king-bolt is placed directly under the axle, or in case it is placed at one side of the axle as shown, then the distance between the king-bolt —5— to the point —x—, which is an imaginary line connecting the meeting points of the reaches and pieces —4—, is equal to one-fourth the distance between the pieces —4—4—.

B—, is a rigid connection between the axle and the platform of the wagon, constructed substantially as shown, secured in any ordinary manner to the axles at its lower end, and having a disk —C— at its upper end which serves as a fifth wheel with which it is connected to the platform.

We are aware that vehicles having diagonal reaches have been heretofore constructed, which apparently accomplished the result, but in fact have failed to overcome the expansion and contraction between the axles. But by constructing the parts substantially as outlined above the connections on the axles are brought on a line with the pivot of said axles. It will therefore be observed that by constructing the details of the gear as above set forth, the wagon may be turned without increasing or lengthening the distance between the king-bolts, thereby producing a wagon which will at all times track.

What we claim as our invention, and desire to secure by Letters Patent, is—

The herein described bolster, comprising a plate —C— rotatably mounted on the king-bolt, and serving as a base upon which the body turns provided with the downwardly divergent and integral arms —B— secured to the axle and having their extremities —4— bent up at right angles, in combination with the diagonally arranged reaches —a— secured to the bent up ends of the said divergent arms, all parts being constructed and arranged substantially as and for the purpose described.

In witness whereof we have hereunto set our hands this 13th day of May, 1892.

THOMAS R. CAPWELL.
WILLIAM C. FULLER.

In presence of—
L. F. STEARNS,
ELTON D. WARNER.